(12) United States Patent
Stuber et al.

(10) Patent No.: US 8,138,944 B2
(45) Date of Patent: Mar. 20, 2012

(54) HOME AREA NETWORKING (HAN) WITH HANDHELD FOR DIAGNOSTICS

(75) Inventors: Michael T. Garrison Stuber, Newman Lake, WA (US); John Buffington, Hauser, ID (US)

(73) Assignee: Itron, Inc., Liberty Lake, WA (US)

( * ) Notice: Subject to any disclaimer, the term of this patent is extended or adjusted under 35 U.S.C. 154(b) by 1230 days.

(21) Appl. No.: 11/899,561

(22) Filed: Sep. 6, 2007

(65) Prior Publication Data

US 2008/0068214 A1    Mar. 20, 2008

Related U.S. Application Data

(60) Provisional application No. 60/845,058, filed on Sep. 15, 2006.

(51) Int. Cl.
*G08C 15/06* (2006.01)
(52) U.S. Cl. ............... 340/870.03; 455/405; 340/870.02
(58) Field of Classification Search .................. 455/405; 340/870.02–870.03
See application file for complete search history.

(56) References Cited

U.S. PATENT DOCUMENTS

| | | | |
|---|---|---|---|
| 4,799,062 A | 1/1989 | Sanderford, Jr. et al. |
| 4,977,577 A | 12/1990 | Arthur et al. |
| 4,998,102 A | 3/1991 | Wyler et al. |
| 5,032,833 A | 7/1991 | LaPorte |
| 5,067,136 A | 11/1991 | Arthur et al. |
| 5,095,493 A | 3/1992 | Arthur et al. |
| 5,119,396 A | 6/1992 | Snderford, Jr. |
| 5,198,796 A | 3/1993 | Hessling, Jr. |
| 5,265,120 A | 11/1993 | Sanderford, Jr. |
| 5,310,075 A | 5/1994 | Wyler |
| 5,311,541 A | 5/1994 | Sanderford, Jr. |
| 5,377,222 A | 12/1994 | Sanderford, Jr. |
| 5,377,232 A | 12/1994 | Davidov et al. |
| 5,457,713 A | 10/1995 | Sanderford, Jr. et al. |
| 5,486,805 A | 1/1996 | Mak |
| 5,598,427 A | 1/1997 | Arthur et al. |
| 5,604,768 A | 2/1997 | Fulton |
| 5,626,755 A | 5/1997 | Keyser et al. |
| 5,661,750 A | 8/1997 | Fulton |
| 5,668,828 A | 9/1997 | Sanderford, Jr. et al. |

(Continued)

FOREIGN PATENT DOCUMENTS

EP          0395495          10/1990

OTHER PUBLICATIONS

International Search Report for PCT International Application No. PCT/US07/19614 mailed Mar. 17, 2008.

*Primary Examiner* — Albert Wong
(74) *Attorney, Agent, or Firm* — Dority & Manning, P.A.

(57) ABSTRACT

Disclosed are handheld or portable apparatus subject matters and associated methodologies for providing local communications to metrology devices within an Advanced Metering System (AMS). The metrology devices may be associated with AC supplied device that are configured with mailboxes for associated battery powered devices or with other home or customer premises area network devices. Battery powered metrology devices may include such as water, gas, and oil meters collocated with electricity meters. Communications between the handheld or portable device may be by way of direct wired or radio frequency connections for providing communications and diagnostic services for home area network coupled components in an Advanced Metering System.

23 Claims, 3 Drawing Sheets

U.S. PATENT DOCUMENTS

| | | | |
|---|---|---|---|
| 5,696,441 A | 12/1997 | Mak et al. |
| RE35,829 E | 6/1998 | Sanderford, Jr. |
| 5,920,589 A | 7/1999 | Rouquette et al. |
| 5,926,531 A | 7/1999 | Petite |
| 5,933,072 A | 8/1999 | Kelley |
| 5,953,368 A | 9/1999 | Sanderford et al. |
| 5,987,058 A | 11/1999 | Sanderford et al. |
| 6,028,522 A | 2/2000 | Petite |
| 6,031,883 A | 2/2000 | Sanderford, Jr. et al. |
| 6,044,062 A | 3/2000 | Brownrigg et al. |
| 6,047,016 A | 4/2000 | Ramberg et al. |
| 6,100,816 A | 8/2000 | Moore |
| 6,163,276 A | 12/2000 | Irving et al. |
| 6,178,197 B1 | 1/2001 | Froelich et al. |
| 6,181,258 B1 | 1/2001 | Summers et al. |
| 6,195,018 B1 | 2/2001 | Ragle et al. |
| 6,218,953 B1 | 4/2001 | Petite |
| 6,232,885 B1 | 5/2001 | Ridenour et al. |
| 6,233,327 B1 | 5/2001 | Petite |
| 6,246,677 B1 | 6/2001 | Nap et al. |
| 6,249,516 B1 | 6/2001 | Brownrigg et al. |
| 6,263,009 B1 | 7/2001 | Ramberg et al. |
| 6,335,953 B1 | 1/2002 | Sanderford, Jr. et al. |
| 6,363,057 B1 | 3/2002 | Ardalan et al. |
| 6,369,769 B1 | 4/2002 | Nap et al. |
| 6,377,609 B1 | 4/2002 | Brennan, Jr. |
| 6,396,839 B1 | 5/2002 | Ardalan et al. |
| 6,424,270 B1 | 7/2002 | Ali |
| 6,426,027 B1 | 7/2002 | Scarborough, III et al. |
| 6,430,268 B1 | 8/2002 | Petite |
| 6,437,692 B1 | 8/2002 | Petite et al. |
| 6,452,986 B1 | 9/2002 | Luxford et al. |
| 6,456,644 B1 | 9/2002 | Ramberg et al. |
| 6,538,577 B1 | 3/2003 | Ehrke et al. |
| 6,570,880 B1 | 5/2003 | Coden |
| 6,604,434 B1 | 8/2003 | Hamilton et al. |
| 6,612,188 B2 | 9/2003 | Hamilton |
| 6,617,879 B1 | 9/2003 | Chung |
| 6,617,976 B2 | 9/2003 | Walden et al. |
| 6,617,978 B2 | 9/2003 | Ridenour et al. |
| 6,618,578 B1 | 9/2003 | Petite |
| 6,626,048 B1 | 9/2003 | Dam Es et al. |
| 6,628,764 B1 | 9/2003 | Petite |
| 6,639,939 B1 | 10/2003 | Naden et al. |
| 6,650,249 B2 | 11/2003 | Meyer et al. |
| 6,657,552 B2 | 12/2003 | Belski et al. |
| 6,671,586 B2 | 12/2003 | David et al. |
| 6,700,902 B1 | 3/2004 | Meyer |
| 6,704,301 B2 | 3/2004 | Chari et al. |
| 6,734,663 B2 | 5/2004 | Fye et al. |
| 6,747,557 B1 | 6/2004 | Petite et al. |
| 6,747,981 B2 | 6/2004 | Ardalan et al. |
| 6,778,099 B1 | 8/2004 | Meyer et al. |
| 6,784,807 B2 | 8/2004 | Petite et al. |
| 6,816,538 B2 | 11/2004 | Shuey et al. |
| 6,836,108 B1 | 12/2004 | Balko et al. |
| 6,836,737 B2 | 12/2004 | Petite et al. |
| 6,850,197 B2 | 2/2005 | Paun |
| 6,859,186 B2 | 2/2005 | Lizalek et al. |
| 6,862,498 B2 | 3/2005 | David et al. |
| 6,867,707 B1 | 3/2005 | Kelley et al. |
| 6,885,309 B1 | 4/2005 | Van Heteren |
| 6,891,838 B1 | 5/2005 | Petite et al. |
| 6,900,737 B1 | 5/2005 | Ardalan et al. |
| 6,914,533 B2 | 7/2005 | Petite |
| 6,914,893 B2 | 7/2005 | Petite |
| 6,918,311 B2 | 7/2005 | Nathan |
| 6,931,445 B2 | 8/2005 | Davis |
| 6,940,396 B2 | 9/2005 | Hammond et al. |
| 6,965,575 B2 | 11/2005 | Srikrishna et al. |
| 6,972,555 B2 | 12/2005 | Balko et al. |
| 6,982,651 B2 | 1/2006 | Fischer |
| 7,004,907 B2 | 2/2006 | Banet et al. |
| 7,046,682 B2 | 5/2006 | Carpenter et al. |
| 7,054,271 B2 | 5/2006 | Brownrigg et al. |
| 7,103,511 B2 | 9/2006 | Petite |
| 7,126,494 B2 | 10/2006 | Ardalan et al. |
| 7,259,690 B1 * | 8/2007 | Furmidge et al. ........ 340/870.03 |
| 7,327,998 B2 * | 2/2008 | Kumar et al. .................. 455/405 |
| 7,336,200 B2 * | 2/2008 | Osterloh et al. ......... 340/870.02 |
| 7,446,673 B2 * | 11/2008 | Ocondi .................... 340/870.03 |
| 7,479,895 B2 * | 1/2009 | Osterloh et al. ......... 340/870.02 |
| 2002/0019725 A1 | 2/2002 | Petite |
| 2002/0115447 A1 | 8/2002 | Martin et al. |
| 2002/0146985 A1 | 10/2002 | Naden |
| 2002/0169643 A1 | 11/2002 | Petite et al. |
| 2003/0048199 A1 | 3/2003 | Zigdon et al. |
| 2003/0063723 A1 | 4/2003 | Booth et al. |
| 2003/0078029 A1 | 4/2003 | Petite |
| 2003/0093484 A1 | 5/2003 | Petite |
| 2003/0103486 A1 | 6/2003 | Salt et al. |
| 2003/0179149 A1 | 9/2003 | Savage et al. |
| 2004/0004555 A1 | 1/2004 | Martin |
| 2004/0008663 A1 | 1/2004 | Srikrishna et al. |
| 2004/0040368 A1 | 3/2004 | Guckenberger et al. |
| 2004/0053639 A1 | 3/2004 | Petite et al. |
| 2004/0061623 A1 | 4/2004 | Tootoonian Mashhad et al. |
| 2004/0062224 A1 | 4/2004 | Brownrigg et al. |
| 2004/0085928 A1 | 5/2004 | Chari et al. |
| 2004/0088083 A1 | 5/2004 | Davis et al. |
| 2004/0131125 A1 | 7/2004 | Sanderford, Jr. et al. |
| 2004/0183687 A1 | 9/2004 | Petite et al. |
| 2004/0192415 A1 | 9/2004 | Luglio et al. |
| 2004/0218616 A1 | 11/2004 | Ardalan et al. |
| 2004/0264379 A1 | 12/2004 | Srikrishna et al. |
| 2004/0264435 A1 | 12/2004 | Chari et al. |
| 2005/0024235 A1 | 2/2005 | Shuey et al. |
| 2005/0030199 A1 | 2/2005 | Petite et al. |
| 2005/0036487 A1 | 2/2005 | Srikrishna |
| 2005/0038326 A1 | 2/2005 | Mathur |
| 2005/0043059 A1 | 2/2005 | Petite et al. |
| 2005/0043860 A1 | 2/2005 | Petite |
| 2005/0052290 A1 | 3/2005 | Naden et al. |
| 2005/0052328 A1 | 3/2005 | De Angelis |
| 2005/0068970 A1 | 3/2005 | Srikrishna et al. |
| 2005/0074015 A1 | 4/2005 | Chari et al. |
| 2005/0129005 A1 | 6/2005 | Srikrishna et al. |
| 2005/0147097 A1 | 7/2005 | Chari et al. |
| 2005/0163144 A1 | 7/2005 | Srikrishna et al. |
| 2005/0169020 A1 | 8/2005 | Knill |
| 2005/0171696 A1 | 8/2005 | Naden et al. |
| 2005/0172024 A1 | 8/2005 | Cheifot et al. |
| 2005/0190055 A1 | 9/2005 | Petite |
| 2005/0195768 A1 | 9/2005 | Petite et al. |
| 2005/0195775 A1 | 9/2005 | Petite et al. |
| 2005/0201397 A1 | 9/2005 | Petite |
| 2005/0218873 A1 | 10/2005 | Shuey et al. |
| 2005/0226179 A1 | 10/2005 | Behroozi |
| 2005/0243867 A1 | 11/2005 | Petite |
| 2005/0248444 A1 | 11/2005 | Joao |
| 2005/0251401 A1 | 11/2005 | Shuey |
| 2005/0251403 A1 | 11/2005 | Shuey |
| 2005/0271006 A1 | 12/2005 | Chari et al. |
| 2005/0278440 A1 | 12/2005 | Scoggins |
| 2006/0002350 A1 | 1/2006 | Behroozi |
| 2006/0012935 A1 | 1/2006 | Murphy |
| 2006/0018303 A1 | 1/2006 | Sugiarto et al. |
| 2006/0031180 A1 | 2/2006 | Tamarkin et al. |
| 2006/0038548 A1 | 2/2006 | Shuey |
| 2006/0043961 A1 | 3/2006 | Loy |
| 2006/0071810 A1 | 4/2006 | Scoggins et al. |
| 2006/0071812 A1 | 4/2006 | Mason, Jr. et al. |
| 2006/0164683 A1 | 7/2006 | Motoyama et al. |
| 2006/0184659 A1 | 8/2006 | Motoyama et al. |

* cited by examiner

HOME AREA NETWORKING (HAN) WITH HANDHELD FOR DIAGNOSTICS

PRIORITY CLAIM

This application claims the benefit of previously filed U.S. Provisional Patent Application entitled "HOME AREA NETWORKING (HAN) WITH HANDHELD FOR DIAGNOSTICS," assigned U.S. Ser. No. 60/845,058, filed Sep. 15, 2006, and which is hereby incorporated herein by reference in its entirety for all purposes.

FIELD OF THE INVENTION

The present technology relates to utility meter communication networks. More particularly, the present technology relates to apparatus and methodologies for providing portable communications between communications system coupled components in an Advanced Metering System (AMS).

BACKGROUND OF THE INVENTION

The general object of metrology is to monitor one or more selected physical phenomena to permit a record of monitored events. Such basic purpose of metrology can be applied to a variety of metering devices used in a number of contexts. One broad area of measurement relates, for example, to utility meters. Such role may also specifically include, in such context, the monitoring of the consumption or production of a variety of forms of energy or other commodities, for example, including but not limited to, electricity, water, gas, or oil.

More particularly concerning electricity meters, mechanical forms of registers have been historically used for outputting accumulated electricity consumption data. Such an approach provided a relatively dependable field device, especially for the basic or relatively lower level task of simply monitoring accumulated kilowatt-hour consumption.

The foregoing basic mechanical form of register was typically limited in its mode of output, so that only a very basic or lower level metrology function was achieved. Subsequently, electronic forms of metrology devices began to be introduced, to permit relatively higher levels of monitoring, involving different forms and modes of data.

In the context of electricity meters specifically, for a variety of management and billing purposes, it became desirable to obtain usage data beyond the basic kilowatt-hour consumption readings available with many electricity meters. For example, additional desired data included rate of electricity consumption, or date and time of consumption (so-called "time of use" data). Solid state devices provided on printed circuit boards, for example, utilizing programmable integrated circuit components, have provided effective tools for implementing many of such higher level monitoring functions desired in the electricity meter context.

In addition to the beneficial introduction of electronic forms of metrology, a variety of electronic registers have been introduced with certain advantages. Still further, other forms of data output have been introduced and are beneficial for certain applications, including wired transmissions, data output via radio frequency transmission, pulse output of data, and telephone line connection via such as modems or cellular linkups.

The advent of such variety and alternatives has often required utility companies to make choices about which technologies to utilize. Such choices have from time to time been made based on philosophical points and preferences and/or based on practical points such as, training and familiarity of field personnel with specific designs.

Another aspect of the progression of technology in such area of metrology is that various retrofit arrangements have been instituted. For example, some attempts have been made to provide basic metering devices with selected more advanced features without having to completely change or replace the basic meter in the field. For example, attempts have been made to outfit a basically mechanical metering device with electronic output of data, such as for facilitating radio telemetry linkages.

Another aspect of the electricity meter industry is that utility companies have large-scale requirements, sometimes involving literally hundreds of thousands of individual meter installations, or data points. Implementing incremental changes in technology, such as retrofitting new features into existing equipment, or attempting to implement changes to basic components which make various components not interchangeable with other configurations already in the field, can generate considerable industry problems.

Electricity meters typically include input circuitry for receiving voltage and current signals at the electrical service. Input circuitry of whatever type or specific design for receiving the electrical service current signals is referred to herein generally as current acquisition circuitry, while input circuitry of whatever type or design for receiving the electrical service voltage signals is referred to herein generally as voltage acquisition circuitry.

Electricity meter input circuitry may be provided with capabilities of monitoring one or more phases, depending on whether monitoring is to be provided in a single or multiphase environment. Moreover, it is desirable that selectively configurable circuitry may be provided so as to enable the provision of new, alternative or upgraded services or processing capabilities within an existing metering device. Such variations in desired monitoring environments or capabilities, however, lead to the requirement that a number of different metrology configurations be devised to accommodate the number of phases required or desired to be monitored or to provide alternative, additional or upgraded processing capability within a utility meter.

More recently a new ANSI protocol, ANSI C12.22, is being developed that may be used to permit open protocol communications among metrology devices from various manufacturers. C12.22 is the designation of the latest subclass of the ANSI C12.xx family of Meter Communication and Data standards presently under development. Presently defined standards include ANSI C12.18 relating to protocol specifications for Type 2 optical ports; ANSI C12.19 relating to Utility industry Meter Data Table definitions; and ANSI C12.21 relating to Plain Old Telephone Service (POTS) transport of C12.19 Data Tables definition. It should be appreciated that while the remainder of the present discussion may describe C12.22 as a standard protocol, that, at least at the time of filing the present application, such protocol is still being developed so that the present disclosure is actually intended to describe an open protocol that may be used as a communications protocol for networked metrology and is referred to for discussion purposes as the C12.22 standard or C12.22 protocol.

Much as HTTP protocol provides for a common application layer for web browsers, C12.22 provides for a common application layer for metering devices. Benefits of using such a standard include the provision of: a methodology for both session and session less communications; common data encryption and security; a common addressing mechanism for use over both proprietary and non-proprietary network mediums; interoperability among metering devices within a common communication environment; system integration with third-party devices through common interfaces and gateway abstraction; both 2-way and 1-way communications with end devices; and enhanced security, reliability and speed for transferring meter data over heterogeneous networks.

To understand why utilities are keenly interested in open protocol communications; consider the process and ease of sending e-mails from a laptop computer or a smart phone. Internet providers depend on the use of open protocols to provide e-mail service. E-mails are sent and received as long as e-mail addresses are valid, mail boxes are not full, and communication paths are functional. Most e-mail users have the option of choosing among several internet providers and several technologies, from dial-up to cellular to broadband, depending mostly on the cost, speed, and mobility. The e-mail addresses are in a common format, and the protocols call for the e-mail to be carried by communication carriers without changing the e-mail. The open protocol laid out in the ANSI C.12.22 standard provides the same opportunity for meter communications over networks.

In addition, the desire for increased processing capabilities as well as other considerations including, but not limited to, a desire to provide portable devices for conducting communications between communications system coupled components in an Advanced Metering System (AMS) that may include a variety of consumption monitoring devices, leads to requirements for supplying communications capabilities to a significant number of meters that may be installed over a significant area often encompassing many square miles and having various data transmission and communications capabilities.

As such, it is desired to provide a universal metrology technology and associated methodology that permits transportation of communications within a metrology system including various types of metrology components including not only electricity meters, but also other types including water, gas, and oil. While various aspects and alternative embodiments may be known in the field of utility metering, no one design has emerged that generally encompasses the above-referenced characteristics and other desirable features associated with utility metering technology as herein presented.

SUMMARY OF THE INVENTION

In view of the recognized features encountered in the prior art and addressed by the present subject matter, an improved apparatus and methodology for providing portable communications capabilities with home area network connected network nodes has been provided.

In an exemplary arrangement, a methodology has been provided to provide diagnostic capabilities for nodes (meters) coupled together over a home area network.

In one of its simpler forms, the present technology provides for the use of a handheld or portable device to provide communications with various residential or customer premises metrology devices.

One positive aspect of this type of arrangement is that on site message delivery and retrieval can be achieve with differing low level transport layers by using a common network node as a communications relay for other nodes.

Another positive aspect of this communication methodology is that it improves opportunities to respond to exception reports from end devices where such responses require on site visits.

Yet another positive aspect of type of arrangement is that selected nodes may be able to be queried without the need for special programming from a remote data Collection Engine.

One exemplary embodiment of the present subject matter relates to an advanced metering system, comprising a network including a central facility and a plurality of end devices, with such network configured for bi-directional communications between the central facility and each of the plurality of end devices, and with selected of such end devices configured to accumulate utility consumption data; and a portable device configured for local bi-directional communications with selected of such plurality of end devices. Additional details as referenced herein may be used in further alternative present combinations for providing further exemplary embodiments of a present advanced metering system.

Still further, it is to be understood that the present subject matter equally relates to associated methodology. One present example of such methodology relates to a method for providing local communications to node devices within a network. Such exemplary methodology may comprise establishing a network including a central facility and a plurality of end devices; configuring the network for bi-directional communications between the central facility and each of the plurality of end devices; configuring selected of the end devices to accumulate utility consumption data; and providing a portable device configured for local bi-directional communications with selected of the plurality of end devices. Still further alternatives of such present exemplary embodiment may variously include additional features and/or steps, such as further disclosed herein.

Additional objects and advantages of the present subject matter are set forth in, or will be apparent to, those of ordinary skill in the art from the detailed description herein. Also, it should be further appreciated that modifications and variations to the specifically illustrated, referred and discussed features and elements hereof may be practiced in various embodiments and uses of the present subject matter without departing from the spirit and scope of the subject matter.

Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents including combinations of features, parts, or steps or configurations thereof not expressly shown in the figures or stated in the detailed description of such figures. Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

Figure 1:
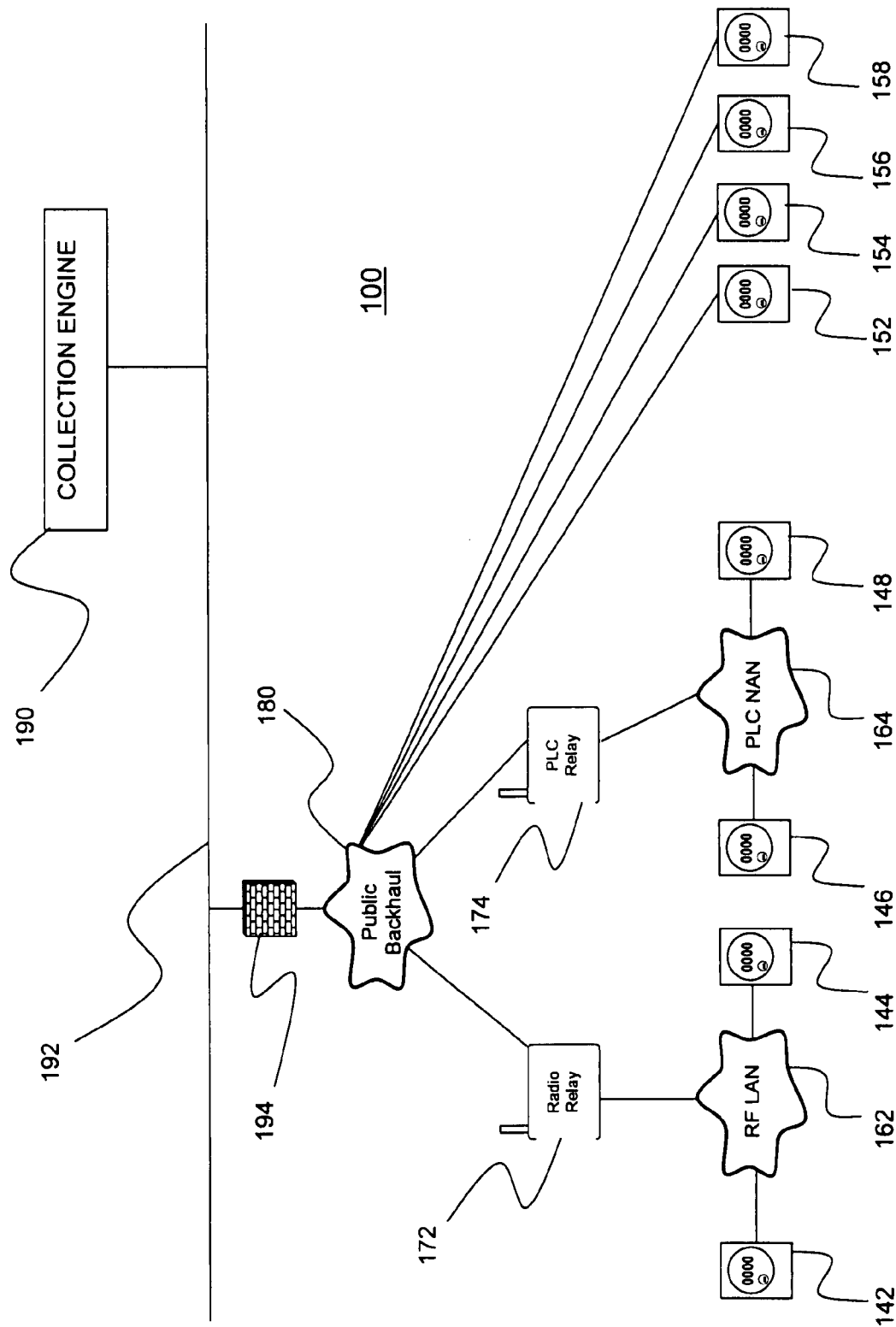
FIG. 1 is a block diagram overview illustration of an Advanced Metering System (AMS) in accordance with the present subject matter.

Repeat use of reference characters throughout the present specification and appended drawings is intended to represent same or analogous features or elements of the present subject matter.

DETAILED DESCRIPTION OF THE PREFERRED EMBODIMENTS

As discussed in the Summary of the Invention section, the present subject matter is particularly concerned with an improved apparatus and methodology for providing portable communications capabilities with home area network connected network nodes.

Selected combinations of aspects of the disclosed technology correspond to a plurality of different embodiments of the present subject matter. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

Reference will now be made in detail to the presently preferred embodiments of the subject home area network communications methodology and apparatus. Referring now to the drawings, FIG. 1 is a block diagram overview illustration of an Advanced Metering System (AMS) in accordance with the present subject matter.

Advanced Metering System (AMS) 100 in accordance with the present subject matter is designed to be a comprehensive system for providing advanced metering information and applications to utilities. AMS 100 is build around industry standard protocols and transports, and is designed to work with standards compliant components from third parties.

Major components of AMS 100 include meters 142, 144, 146, 148, 152, 154, 156, 158; one or more radio networks including RF neighborhood area network (RF NAN) 162 and accompanying Radio Relay 172 and power line communications neighborhood area network (PLC NAN) 164 and accompanying PLC Relay 174; an IP based Public Backhaul 180; and a Collection Engine 190. Other components within AMS 100 include a utility LAN 192 and firewall 194 through which communications signals to and from Collection Engine 190 may be transported from and to meters 142, 144, 146, 148, 152, 154, 156, 158 or other devices including, but not limited to, Radio Relay 172 and PLC Relay 174.

AMS 100 is configured to be transportation agnostic or transparent; such that meters 142, 144, 146, 148, 152, 154, 156, 158 may be interrogated using Collection Engine 190 regardless of what network infrastructure lay in between. Moreover, due to this transparency, the meters may also respond to Collection Engine 190 in the same manner.

As illustrated in FIG. 1, Collection Engine 190 is capable of integrating Radio, PLC, and IP connected meters. To facilitate this transparency, AMS 100 uses ANSI C12.22 meter communication protocol for networks. C12.22 is a network transparent protocol, which allows communications across disparate and asymmetrical network substrates. C12.22 details all aspects of communications, allowing C12.22 compliant meters produced by third parties to be integrated into a single advanced metering interface (MI) solution. AMS 100 is configured to provide meter reading as well as load control/demand response, in home messaging, and outage and restoration capabilities. All data flowing across the system is sent in the form of C12.19 tables. The system provides full two-way messaging to every device; however, many of its functions may be provided through broadcast or multicast messaging and session-less communications.

In accordance with the present subject matter, the disparate and asymmetrical network substrates may be accommodated by way of a native network interface having the capability to plug in different low level transport layers using NET interfaces. In accordance with an exemplary configuration, Transmission Control Protocol/Internet Protocol (TCP/IP) may be employed and the remainder of the present discussion is directed to such a choice of transport layer. It should be appreciated, however, that TCP/IP is not the only such low level transport layer protocol available and that other protocols such as User Datagram Protocol (UDP) may be used.

A Native Network Interface in accordance with the present technology provides access to the physical, i.e., native, network protocol from the C12.22 protocol stack in C12.22 Host applications. The design includes a base class for reuse in development of the transport layer. The main interface methods provide standard sessionless server and client methods for sending and receiving data although session-based communication may also be employed. The base class also includes access to a standard logging mechanism, common instrumentation through Windows Management Instrumentation (WMI), and standard status and diagnostic reporting. A static method is used to load the transport layer assembly, transparently to the client application. The transport layer assemblies may be configurable to include more control over incoming messages to accommodate variable length messages more efficiently, and provide a configurable security interface.

While data collection can be addressed by scheduling AMR nodes to connect at different times or by contacting AMR nodes individually, such a methodology would require a significant amount of time as well as a great deal of program management. A first data collection methodology in accordance with the present subject matter allows AMR responses to be distributed randomly over time, thus optimizing the use of available AMR network bandwidth while avoiding advanced management techniques. In accordance with a second data collection methodology, a handheld or portable device 280 may be provided for local collection of data.

Figure 2:
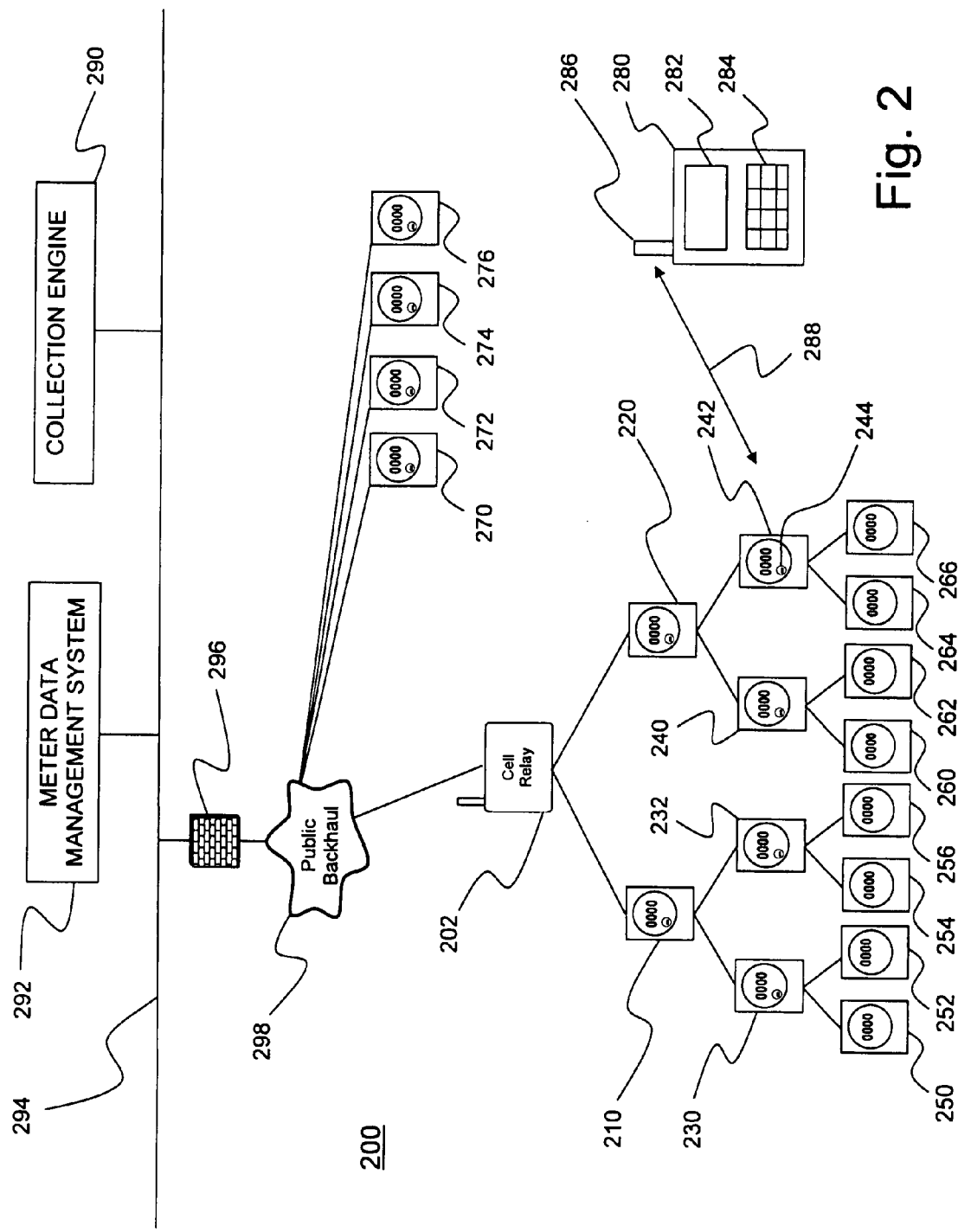
FIG. 2 illustrates an exemplary Advanced Metering System deployment incorporating various methodology aspects of the present subject matter.

With present reference to FIG. 2, it will be seen that an exemplary Advanced Metering System (AMS) generally 200 deployment has been illustrated. FIG. 2 illustrates for exemplary purposes only a single RF LAN cell, with multiple member nodes organized into three levels, as well as four directly connected IP meters 270, 272, 274, and 276. In such system, respective meter devices 210, 220, 230, 232, 240, 242, 250, 252, 254, 256, 260, 262, 264, 266, 270, 272, 274, and 276, Cell Relay 202, and Collection Engine 290, have C12.22 network addresses. Collection Engine 290 may in accordance with the present subject matter have multiple C12.22 addresses to allow for separate addressing between different services (functionalities). Meter (or master) data management system 292 is not part of the C12.22 network, but preferably it will be implemented so as to communicate over the Utility LAN 294 to Collection Engine 290 via Web Services. Communications between Cell Relay 202 and Utility LAN 294 variously involve Public Backhaul 298 and firewall 296, in a manner analogous to that discussed above in conjunction with Public Backhaul 180 and firewall 194 (FIG. 1), as well understood by those of ordinary skill in the art.

A first exemplary meter data acquisition process begins with the Meter (or Master) Data Management System 292 initiating a request for data. Such operation is done through a web services call to Collection Engine 290 and may be performed without knowledge of the configured functionality of the end-device. Collection Engine 290 analyzes the request for data, and formulates a series of C12.22 multicast (or broadcast) data requests. Such requests are then sent out either directly to the device (in the case of an IP connected meter, such as 270), or to Cell Relay 202 that relays the message out to all appropriate nodes. Broadcast and multicast messages are sent by Cell Relay 202 to all members of the cell, either via an AMS RF LAN-level broadcast, or by the Cell Relay repeating the message. For efficiency sake, the use of an RF LAN level broadcast may be preferred.

Typically these requests are sent as a call to a manufacturer's stored procedure. In C12.22, stored procedure calls are performed as writes to a predetermined table, "table 7." The stored procedure will send the default upload configured for such device. For example, a given meter may be configured to upload two channels of hourly interval data, plus its event history. Another meter might be programmed to send up its TOU registers. The stored procedure will require four parameters to be fully operative in accordance with the present subject matter: data start time, data end time, response start time, and response end time. The data start and end time are be used to select which data to send. The response start time and end time are used to determine the window within which the upstream system wants to receive the data. The various AMS enabled meters of FIG. 2 are preferably field programmable, via C12.22 tables, as to the type data to be included in a default upload.

When data is sent to Collection Engine 290, is it sent as C12.19 table self-write with the notification bit set, and the do-not-respond bit set. The result is that per the present subject matter no C12.22 acknowledgement is sent in response to the Collection Engine's broadcast, nor does the Collection Engine 290 in response to the notify-write send any response; however, the notify-write effectively serves per the present subject matter as an acknowledgement to the receipt of the broadcast.

The response processing section can use the configured data about an end device and the response message from the end device to determine the results from the device. The response processing section begins operation associated with a specific job in a task list, but can be switched between any active job that is awaiting a response. Such operation allows responses that contain logs from the device to be parsed by each job that could be waiting for an action to be completed within the end-device. Such also would allow unsolicited messages to be parsed by the IMA (Interface between Meter and Application) code and then later associated with any possible jobs, as determined by the IMA, all in accordance with the present subject matter.

While most operations will not require this, the AMS meters will support chaining a series of C12.22 Extended Protocol Specification for Electronic Metering (EPSEM) messages, such as multiple table reads and writes in a single request. This is functionality that is required in the C12.22 specification, and will assist in improving the efficiency of the system, as it avoids the overhead of sending a separate message for each EPSEM command. AMS enabled devices will process each request sequentially, allowing a series of operations to be handled in a single command, each building on the next, such that a read subsequent to a write would reflect the results of the request write. If a command in an EPSEM chain cannot be completed, remaining commands in the chain are rejected with appropriate error messages, per the present subject matter.

When a respective device receives a request, it evaluates the multi-cast address specified. If the device is a member of the multicast group, it responds to the request; otherwise, it discards it. Membership in different multicast groups is determined via use of C12.22 standard table 122.

On-demand reading per the present subject matter is similar to the Daily Meter Data Acquisition Process; however, rather than sending a broadcast or multicast request, the on-demand reading process in accordance with the present subject matter communicates directly to desired respective meters. Such process begins with a user initiated an on-demand read through an AMS User Interface, or through a web services call from an upstream system. Per the present subject matter, an orchestration layer of the Collection Engine 290 begins by evaluating the current system load of the communications substrate through which the respective device is connected. Requests for an on-demand read from a saturated cell may be rejected.

Once Collection Engine 290 determines that the request can be honored, it selects per the present subject matter an appropriate communication server within the Collection Engine, and submits the command to retrieve data from the device and return it. The communications server forms a C12.22 table read request, encrypts it, and sends it to the device directly, if IP connected, or to Cell Relay 202 for RF LAN connected devices. In cases where traffic flows through the RF LAN, the Cell Relay software retrieves the message from the IP backhaul 298, and evaluates the message. The destination address (in C12.22 terminology, the called ApTitle) may be stripped off to save bandwidth on the network, relying instead on the underlying RF LAN addressing scheme for delivering the message. The Cell Relay software must also examine whether the destination ApTitle is still valid within the cell. If the destination ApTitle is no longer valid, the Cell Relay rejects the message, returning an error packet to the Collection Engine. Provided that the destination is still valid, the Cell Relay software sends the message to the device across the RF LAN, per the present subject matter.

In accordance with present technology, several of the groupings of meters illustrated in FIG. 2 may correspond to various types of meters at or near a residence or customer premises that may take advantage of the AMS communication system of the present subject matter to form a home area network. In particular, Meters 230, 232, 240, and 242 may correspond to electricity meters in a meter group; meters 250, 254, 260, and 264 may correspond to water meters associated with meters 230, 232, 240, and 242 respectively and meters 252, 256, 262, and 266 may correspond to gas meters associated with meters 230, 232, 240, and 242 respectively.

According to present technology, electricity meters 230, 232, 240, and 242 may include communications equipment that is constantly energized by way of the individual meters connection to a source of alternating current (AC) electricity. Meters 250, 252, 254, 256, 260, 262, 264, and 266, on the other hand, are not coupled to an AC source but rather their communications equipment may be supplied by way of an onboard battery power supply. In this manner, electricity meters 230, 232, 240, and 242 form hubs for a home area network through which meters 250, 252, 254, 256, 260, 262, 264, and 266 may communicate with Collection Engine 290 or other network nodes. Such other network nodes may include other types of devices residing within a residence or customer premises include devices such as, but not limited to, appliances, display devices, and electronic control devices.

In order to conserve battery power, battery operated meters 250, 252, 254, 256, 260, 262, 264, and 266 may be associated with the respective electricity meters 230, 232, 240, and 242 so that communications between battery powered meters 250, 252, 254, 256, 260, 262, 264, and 266 may be conducted with Collection Engine 290 by way of the respective electricity meters 230, 232, 240, and 242 by providing in the electricity meters dedicated portions of memory configured to serve as "mailboxes" for the battery powered meters 250, 252, 254, 256, 260, 262, 264, and 266.

When, for example, a message is broadcast, multicast, or specifically addressed to an individual network node (meter), a protocol stack for the RF LAN advantageously takes the message and constructs a node path for the message to take before actually transmitting the packet. Such pre-constructed node path allows Cell Relay 202 per the present subject matter to push a message down through the tree of the cell without creating redundant radio messages.

If Collection Engine 290 wants to do an on-demand read to gas meter 256, it starts by sending the message to Cell Relay 202. Cell Relay 202 in turn sends out a transmission that will be heard by both respective electricity meters 210 and 220 (in the exemplary configuration of present FIG. 2). Meter 220 could go ahead and retransmit the message, but this wouldn't get the message to gas meter 256. Instead, it would simply waste bandwidth. With the node path provided to by the RF LAN protocol stack, meters 210 and 220 will hear the message, but per the present subject matter only meter 210 will retransmit the message. The retransmitted message of meter 210 will be heard by both meters 230 and 232, but only meter 232 will be in the node path, again meaning other parts of the cell (such as meters 250 and 252) won't receive a message that would be useless to them.

In accordance with the present technology, electricity meter 232 has contained there in dedicated storage space configured to operate as a mailbox for gas meter 256 as well as water meter 254 and possibly an oil meter (not illustrated) or other home area network devices including such as might be installed separately within a residence or customer premises. As the battery operated meters associated with electricity meter 232, in this case meters 254 and 256, are configured to "wake up" only periodically in order to save battery power, the mailbox in electricity meter 232 associated with gas meter 256 will store any message directed to gas meter 256's address until such time as gas meter 256 wakes up and checks its mail in its mailbox. The mailbox may also store messages sent from the gas meter 256 or any other home area network device until such time as the message may be forwarded to Collection Engine 290 or other network address.

Figure 3:
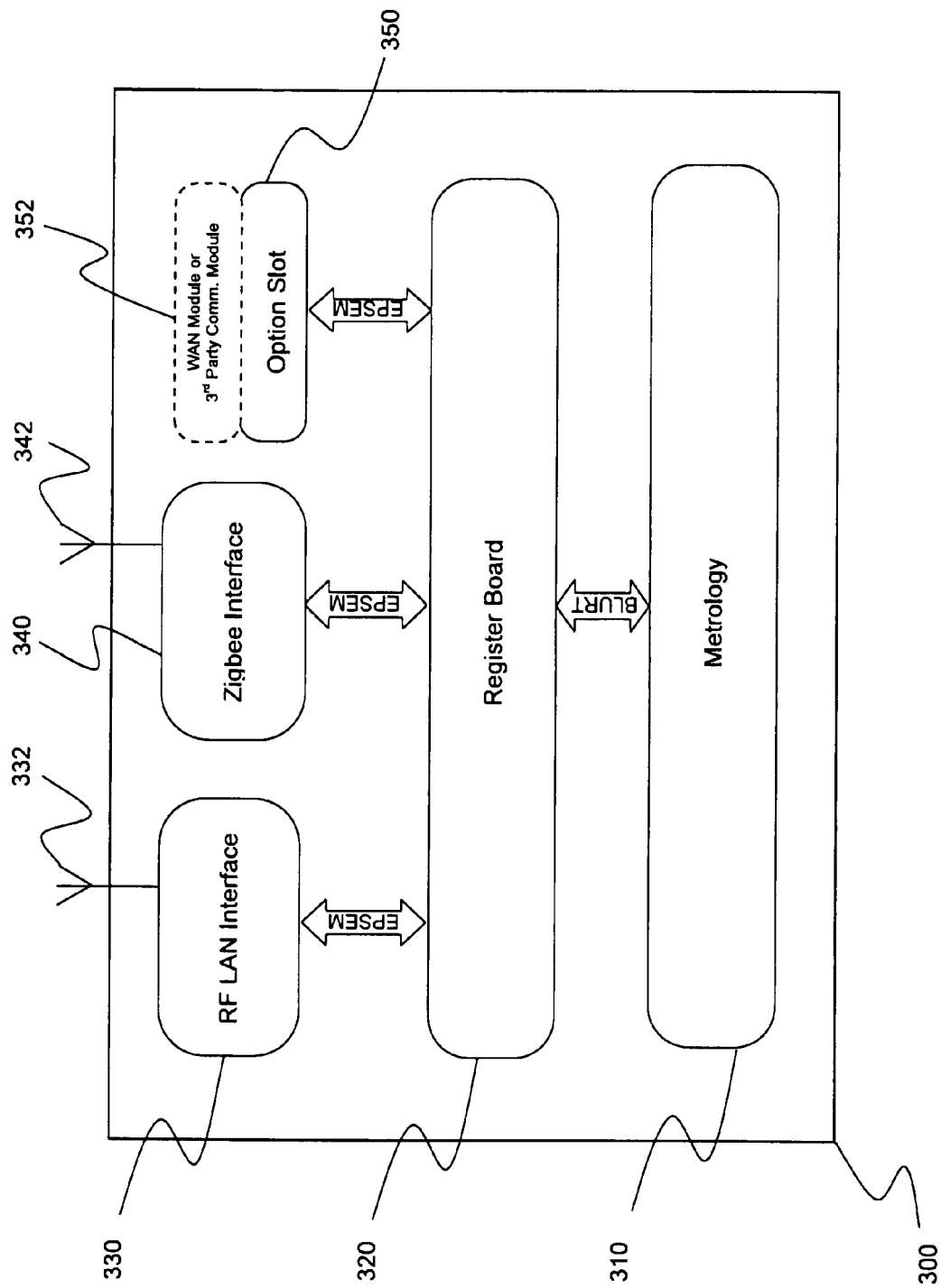
FIG. 3 illustrates a block diagram of an exemplary meter incorporating interface features in accordance with the present subject matter.

Once the message is received at gas meter 256, the meter must unpack the request and act on it. The communications module within the device will pull the C12.22 message out of its mailbox housed on electricity meter 232 and provide it to its Register Board 320 (FIG. 3). Register Board 320 will decrypt the message based on shared keys, and then respond to the request, encrypting it and returning it to the calling ApTitle either directly via the RF LAN (as the gas meter 256 is now awake) or by way of its mailbox for later delivery. In the case of the RF LAN, the message is simply forwarded to the next layer up in the cell. Messages are forwarded from one layer to the next until they finally reach Cell Relay 202, which relays it across the IP backhaul 298 to the communications server that initiated the transaction.

With further reference to FIG. 2, it will be noticed that a second exemplary data collection apparatus and methodology is illustrated in the form of a handheld or portable device generally illustrated at 280. Handheld or portable device 280 generally corresponds to a device capable of communicating directly with RF LAN connected components including Cell Relay 202 and meters 210, 220, 230, 232, 240, and 242. In accordance with the present technology, handheld or portable device 280 may conduct communications using a radio frequency link established through onboard radio frequency transceiving equipment via antenna 286 as represented by double headed arrow 288 with, for example, meter 242. Handheld or portable device 280 may also or alternatively communicate with meter 242 via direct electrical or optical coupling by way of communications port 244 associated with meter 242 or similar such communications ports associated with other network nodes (meters).

Handheld or portable device 280 may further be provided with an information display component 282 as well as a keypad or other operations facilitating control elements generally 284. Information display component 282 may correspond to a liquid crystal display (LCD) or any other suitable type of display depending on the exact nature of the information to be displayed. It is anticipated that different types of portable devices may be provided with differing capabilities thus requiring different display capabilities as well as differing input or control capabilities via control elements 284.

In accordance with the present subject matter, device 280 may be configured for onsite communications with and control of home area network devices. In addition, device 280 may provide diagnostic capabilities to assist service personnel in resolving problems or service requirements as may arise with home area network connected nodes. As an example, service personnel installing or configuring water meter 264 or gas meter 266 for association with electricity meter 242 may employ device 280 to assign mailboxes in electricity meter 242 to water meter 264 and/or gas meter 266 as well as assign specific network addresses for any or all of the meters. Alternatively, service personnel may read data (mail) from or send data to water meter 264 and/or gas meter 266 via previously established mailboxes associated with electricity meter 242.

Those of ordinary skill in the art will also appreciate that communications may also be conducted by device 280 using electricity meter 242 as a relaying device with other devices coupled to a home area network established through electricity meter 242. Such other home area network devices may include, but are not limited to, devices located within a residence or customer premises such as appliances, display devices, heating control devices, security devices and other devices as may advantageously be controlled over or communicated with via utility LAN 294.

With reference now to FIG. 3, there is illustrated a block diagram of an exemplary meter 300 incorporating interface features in accordance with the present subject matter. Meter 300 incorporates several major components including metrology 310, a register board 320 and one or more communications devices. In the presently illustrated configuration, meter 300 may include an RF LAN Interface 330 and accompanying antenna 332 and a Zigbee Interface 340 and its accompanying antenna 342. In addition, an Option Slot 350 may be provided to accommodate a third party network or communications module 352.

Metrology 310 may correspond to a solid-state device configured to provide an internal C12.18 blurt communications to register board 320. Communications within meter 300 is conducted via C12.22 Extended Protocol Specification for Electronic Metering (EPSEM) messages. The meter register board 320 is configured to fully support C12.19 tables and C12.22 extensions. While all meter data will be accessible via standard C12.19 tables, in order to facilitate very low bandwidth communications, manufacturers tables or stored procedures are included which provide access to specific timebound slices of data, such as the last calendar day's worth of interval data or other customized "groupings" of data.

Meter 300 may be variously configured to provide differing communications capabilities depending on whether the metrology is designed for electricity meters and thus has available a continuously available AC supply source or is configured as a battery operated device to be activated for communications sessions on an intermittent or scheduled basis to monitor water, gas or oil consumption. In exemplary configurations, one or more of GPRS, Ethernet, and RF LAN communications modules may be provided. GPRS will allow meters to be IP addressable over a public backhaul and provide more bandwidth than the meter will ever require, but may incur ongoing subscriptions costs. Ethernet connectivity can be used to bridge to third party technologies, including WiFi, WiMax, in-home gateways, and BPL, without integrating any of these technologies directly into the metering device, but with the tradeoff of external wiring and a two part solution. Ethernet devices may be used primarily in pilots and other special applications; though they may be ideal for certain high-density RF-intolerant environments such as meter closets.

Due to the increased complexity of managing a WAN interface, with its more sophisticated link negotiation requirements and TCP/IP stack, WAN connected meters may include an additional circuit board dedicated to WAN connectivity. This board will interface with meter 300 using EPSEM messages and Option Slot 350.

The availability of Option Slot 350 within meter 300 provides the advantage that it will make meter 300 available for integration with third party backhauls, such as PLC. In order for such third party devices to be integrated into AMS 100, on the other hand, third party devices will need to include both a communications board and a C12.22 compliant relay to couple communications signals from the third party's proprietary network to an IP connection. Alternatively, third parties could integrate meter 300 it into their own end-to-end solution.

The communications protocol between meter 300 and communications modules 330, 340, and WAN module or optional third part communications module 352 follow the C12.22 standards, allowing any third party to design to the standard and be assured of relatively straightforward integration.

Communication to the Collection Engine 190 is performed over an Internet Protocol connection. The Wide-Area-Network is a fully routable, addressable, IP network that may involve a variety of different technologies including, but not limited to, GPRS, WiFi, WiMax, Fiber, Private Ethernet, BPL, or any other connection with sufficiently high bandwidth and ability to support full two-way IP communication. Several assumptions may be made regarding the IP WAN. Collection Engine 190 is assumed to be able to communicate directly with other nodes on the IP WAN. While communications may be conducted through a firewall 194, it is not necessary that such be proxied, unless the proxy is itself a C12.22 node functioning as a relay between a private IP network and the public IP WAN.

In accordance with present technology, local communications with meter 300 may be established via handheld or portable device 280 (FIG. 2) via RF LAN Interface 330, Zigbee Interface 340, or alternately via other methods or devices via Option Slot 350 mounted devices. Such other alternate methods may include optical or direct connections as previously noted.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for providing local communications to node devices within a network, comprising:
   establishing a network including a central facility and a plurality of end devices;
   configuring the network for bi-directional communications between the central facility and each of the plurality of end devices;
   configuring selected end devices to accumulate utility consumption data;
   providing a portable device configured for local bi-directional communications with the selected plurality of end devices;
   providing selected of the plurality of end devices with memory portions; and
   transmitting signals to selected plurality of end devices with memory portions to configure the memory portions as one or more mailboxes for storing messages addressed to selected others of the plurality of end devices and messages from selected others of the plurality of end devices.

2. A method as in claim 1, wherein transmitting signals, comprises transmitting signals from the portable device.

3. A method as in claim 1, wherein transmitting signals comprises transmitting radio frequency signals.

4. A method as in claim 2, wherein transmitting signals comprises transmitting Zigbee signals.

5. A method as in claim 2, wherein transmitting signals comprises transmitting optical signals.

6. A method as in claim 2, further comprising:
   providing the portable device with a display portion;
   providing the portable device with a manual input portion; and
   transmitting signals from the portable device to selected of the plurality of end devices to perform diagnostic services.

7. A method as in claim 6, further comprising:
   locating selected of the plurality of end devices within a customer premise; and
   configuring selected of the plurality of end devices located within a customer premise to be controlled over the network.

8. A method as in claim 7, further comprising configuring selected of the plurality of end devices as relay devices to relay messages to other of the plurality of end devices.

9. A method as in claim 8, further comprising configuring selected of the relay devices to accumulate electricity consumption data.

10. A method as in claim 8, further comprising configuring selected of the end devices to accumulate utility consumption data based on consumption of one of water, gas and oil.

11. A method as in claim 8, further comprising transmitting signals from the portable device to selected of the relay devices for relay to end devices located within a customer premise.

12. A method as in claim 9, further comprising:
transmitting signals from the portable device to selected of the devices configured to accumulate electricity consumption to instruct the devices to transmit data indicative of the accumulated electricity consumption; and
displaying indications of the transmitted data on the display portion of the portable device.

13. A method as in claim 10, further comprising:
transmitting signals from the portable device to selected of the devices configured to accumulate utility consumption data based on consumption of one of water, gas and oil to instruct the devices to transmit data indicative of the accumulated consumption; and
displaying indications of the transmitted data on the display portion of the portable device.

14. A method as in claim 13, wherein transmitting signals comprises transmitting a message to a mailbox assigned to the device.

15. An advanced metering system, comprising:
a network including a central facility and a plurality of end devices, with said network configured for bi-directional communications between said central facility and each of said plurality of end devices, and with selected said end devices configured to accumulate utility consumption data;
a portable device configured for local bi-directional communications with selected said plurality of end devices; and
a plurality of memory devices respectively associated with selected said plurality of end devices, portions of said memory devices being configured as one or more mailboxes for storing messages addressed to selected others of the plurality of end devices and messages from selected others of said plurality of end devices.

16. An advanced metering system as in claim 15, wherein said portable device is configured to transmit a wireless signal to selected of said plurality of end devices.

17. An advanced metering system as in claim 15, wherein said portable device is configured to transmit a Zigbee signal to selected of said plurality of end devices.

18. An advanced metering system as in claim 15, wherein said portable device is configured to transmit an optical signal to selected of said plurality of end devices.

19. An advanced metering system as in claim 15, further comprising a display portion and a manual input portion associated with said portable device, whereby signals transmitted between said portable device and selected of said plurality of end devices may be used to perform diagnostic services.

20. An advanced metering system as in claim 15, wherein selected of said plurality of end devices are located within a customer premise and are configured to be controlled over said network by one of said central facility and said portable device.

21. An advanced metering system as in claim 20, wherein selected of said plurality of end devices are configured as relay devices to relay messages to other of said plurality of end devices.

22. An advanced metering system as in claim 20, wherein selected of said plurality of end devices are configured to accumulate electricity consumption data.

23. An advanced metering system as in claim 20, wherein selected of said plurality of end devices are battery operated and configured to accumulate utility consumption data based on consumption of one of water, gas and oil.

* * * * *